United States Patent Office 3,193,200
Patented July 6, 1965

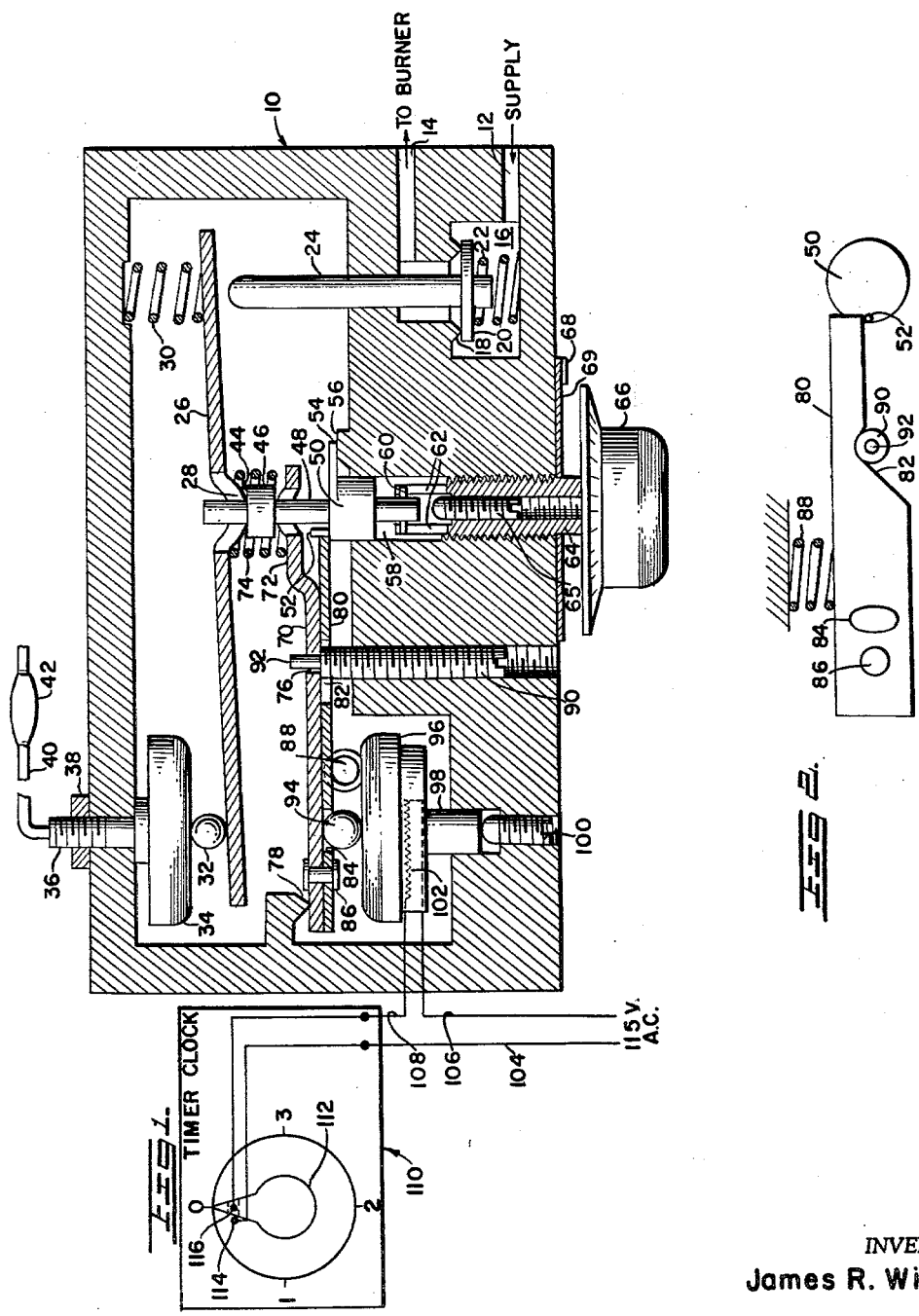

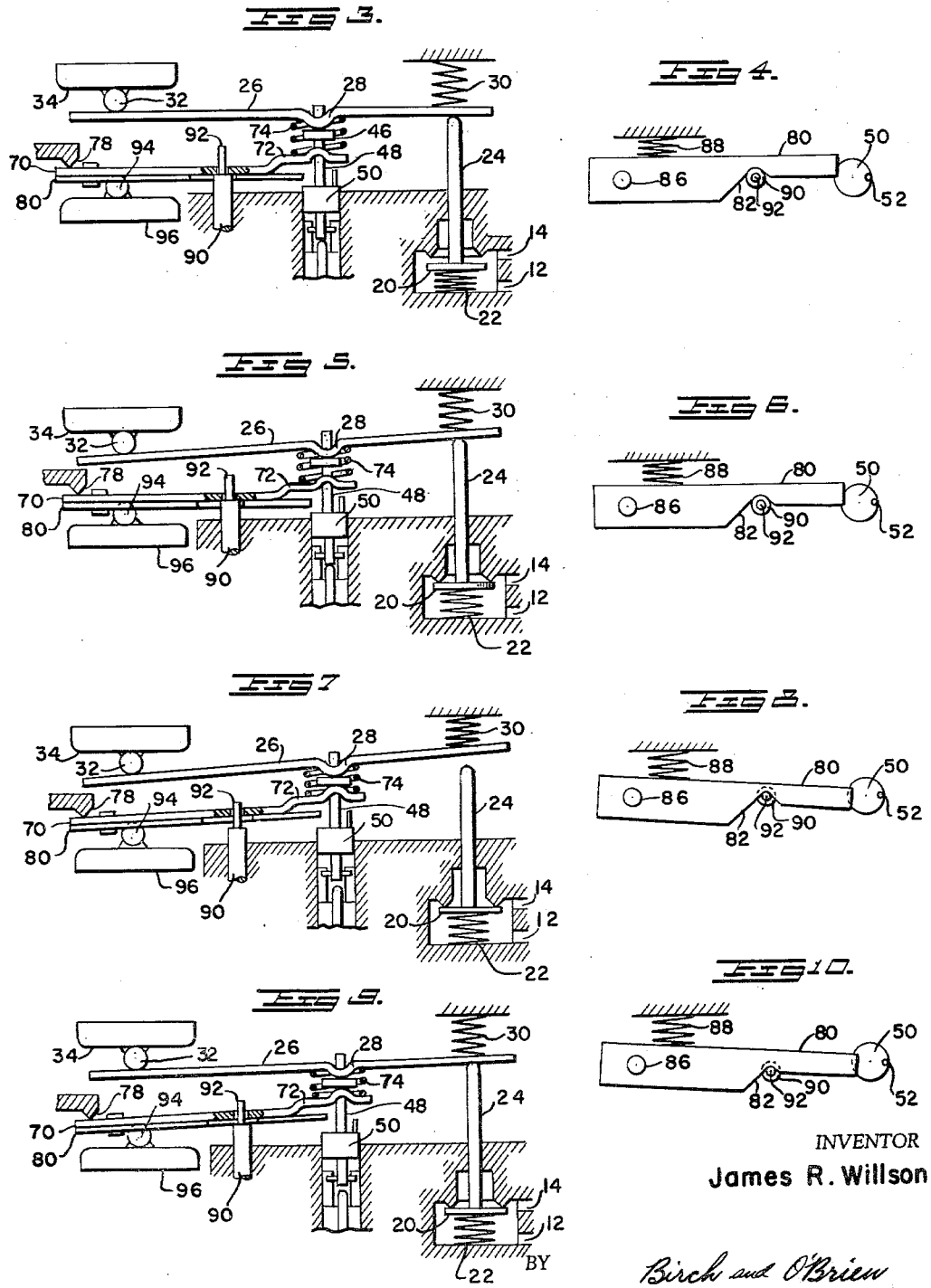

3,193,200
THERMOSTATIC CONTROL AND TIMER CLEARING SYSTEM
James R. Willson, Greensburg, Pa., assignor to Robertshaw Controls Company, Richmond, Va., a corporation of Delaware
Filed May 7, 1963, Ser. No. 278,661
10 Claims. (Cl. 236—46)

This invention relates to temperature control apparatus and in particular to temperature and time controls for heating units as utilized in cooking ovens and the like.

In certain timed temperature controls for cooking ovens, it is desirable to modulate the oven burner to maintain a preset cooking temperature for a predetermined cooking time. Upon expiration of the predetermined cooking time, the flow of fuel to the oven burner is reduced so that the oven is maintained at a warming temperature until the central apparatus is turned off manually. An electric time-of-day clock is provided with a manual timer knob and timer mechanism, which is manually movable from a timer off position to a selected one of a plurality of cooking time positions and is subsequently returned to the zero time position by an electric motor in the clock. While the timer knob and mechanism is being moved from the selected cooking time position to a zero time position, the oven is maintained at its preset cooking temperature by the thermostatic control device. When the timer knob and mechanism reach the zero time position, the oven is maintained at a lower temperature by control apparatus including a heat motor actuated by the timer whereby the food is kept warm for an indefinite period which is terminated by the operator manually turning off the control apparatus.

A particular problem with the above arrangement is that upon manual termination of both the timing and the heating operations, the timer mechanism is subject to a clearing operation whereby the timer mechanism automatically moves from the zero time position to a timer off position. Because of use with the time-of-day clock and the switch constructions between the timer and the thermostatic control effecting a timed temperature cooking period, the clearing operation requires a particular sequence of switch operation whereby the timer is re-energized for movement from the zero time position to the timer off position. In order to obtain the required switching sequence, the total reset time is spread and the timer requires a reenergization period to complete its reset function. Such a period for the clearing operation may vary between five and thirty minutes, which must expire before the timer returns to the timer off position where it is then ready for subsequent use.

It is, therefore, an object of the present invention to permit immediate resetting of a timed temperature control device after a previous use.

This invention has another object in that instantaneous self-clearing is effected in a timed temperature control system.

The present invention is characterized in that a control device has valve means movable by lever means between a plurality of control positions for regulating a flow of fuel to an oven burner. The lever means is positioned by temperature setting means and is movable to maintain a selected oven temperature by thermally responsive means; the lever means is moved to a second position corresponding to a second oven temperature by timing means which includes a heat motor energized for only a short period at the end of the selected cooking time and which is interconnected with the temperature setting means for a clearing movement thereby when the control device is turned to an off position.

Additional objects and advantages of the present invention will become apparent from the following description of preferred embodiment taken in connection with the accompanying drawings wherein:

FIGURE 1 is a schematic diagram, partly in section, of a timed temperature control device embodying this invention;

FIGURE 2 is a plan view of a detail of FIGURE 1;

FIGURE 3 is a reduced, partial view of FIGURE 1 with the operating elements in another controlling position;

FIGURE 4 is a reduced plan view showing the detail of FIGURE 2 in its position corresponding to FIGURE 3;

FIGURES 5 and 6 are views similar to FIGURES 3 and 4 but showing the elements in another controlling position;

FIGURES 7 and 8 are views similar to FIGURES 3 and 4 but showing the elements in another controlling position; and FIGURES 9 and 10 are views similar to FIGURES 3 and 4 but showing the elements in another controlling position.

Referring first to FIGURE 1, the present invention is embodied in a timed temperature control system including a casing 10 having an inlet 12 adapted to be connected to a fuel supply and an outlet 14 adapted to be connected to the burner of a heating unit such as a cooking oven (not shown). The inlet 12 and outlet 14 communicate with a valve chamber 16 having a fixed annular valve seat 18 which is engaged by a movable valve member in the form of an annular disc 20 to control a flow of fuel through the valve chamber. The valve disc 20 is normally closed against the valve seat 18 by means of a coil spring 22 mounted in compression between a wall of chamber 16 and the upstream side of the valve disc 20. The valve disc 20 is carried adjacent the end of a valve stem 24 which slidably extends through an internal partition wall of casing 10 so that its free end is disposed in a hollow portion of casing 10.

Movement of the valve stem 24 and valve disc 20 is effected by an actuating lever 26 having a pivotal axis 28 intermediate its ends. Adjacent one of its ends the lever 26 is normally biased into engagement with the free end of the valve stem 24 as by a coil spring 30 mounted in compression between an internal wall of casing 10 and the top surface of lever 26. Adjacent its opposite end the top surface of lever 26 is engaged by a ball element 32 welded or otherwise secured to an expanding and contracting power element 34 which may be of any suitable type that is well-known in the art such as diaphragm or bellows types. The power element 34 is mounted on a rear wall of casing 10 by means of a threaded stud 36 and a locknut 38. The stud 36 is provided with a central bore (not shown), one end of which communicates with the interior of the power element 34 while its other end receives the end of a capillary tube 40, which in turn is connected to a temperature sensing bulb 42 suitably positioned in the space to be temperature controlled, such as the cooking oven.

The power element 34, the bored stud 36, the capillary tube 40 and the sensing bulb 42 constitute a closed system filled with an expansible fluid so that a variation in temperature sensed by the bulb 42 produces a corresponding expansion or contraction of the power element 34. With this arrangement, a corresponding movement is imparted to the actuating lever 26 to produce reciprocation of the valve disc 20 in response to temperature variations.

The pivotal axis 28 of the lever 26 is disposed on a fulcrum or platform 44 defined by the upper surface of a collar 46 integrally formed on a rotatable and axially movable shaft 48. The pivotal axis 28 is formed by a centrally bored dimple which permits the free end of the shaft 48 to extend through the lever 26. Intermediate its ends, the shaft 48 integrally carries a guide collar 50, the upper surface of which has a vertical pin 52 on one peripheral edge portion and a horizontal projection 54 extending radially outwardly from another peripheral edge portion. As is illustrated in FIGURE 1, the projection 54 is movably disposed on the top surface of a stop 56 that is formed on an internal wall portion of casing 10 and will retain the shaft 48 in an inoperative position so as to prevent accidental opening of the main valve member 20. The stop 56 has a rear surface (not shown) sloping downwardly to facilitate rotary and axial movement of the shaft 48 to and from its off position. The lower part of guide collar 50 is slidably and rotatably disposed in a bore 58 extending through the front wall of casing 10.

Below the guide collar 50 the end of shaft 48 is provided with a cross pin 60 that protrudes into opposed longitudinal slots 62 of an externally threaded sleeve 64. The pin and slot connection permits rotary movement of the sleeve 64 to be imparted to the shaft 48 and permits the shaft 48 to move axially relative to the sleeve 64. The outermost portion of the bore 58 is suitably threaded to receive the threaded sleeve 64 which has an external end connected to a temperature setting dial 66. The dial 66 is marked with suitable indicia corresponding to desired oven temperatures, which cooperates with a fixed indicia mark 68 on a casing bezel plate 69. The sleeve 64 is provided with an internally threaded bore that receives an adjustable set screw 65 having a protruding end disposed for abutting relation with the end of shaft 48.

In addition to being positioned for a particular cooking temperature setting, the valve actuating lever 26 is movable to a second position for the purpose of maintaining a warming temperature in the oven being heated. As is illustrated in FIGURE 1, a heat motor lever 70 has an offset end portion 72 which is engageable with the lower surface of the collar 46. The offset 72 includes a bored dimple through which the shaft 48 extends and which is arranged in opposition to the lever axis 28; thus the offset 72 and lever axis 28 are opposed to each other on opposite sides of the collar 46. A coil spring 74 encircles the collar 46 and is mounted in compression between the offset 72 and the lever 26 for normally biasing the same away from each other. Adjacent the offset 72 the heat motor lever 70 is provided with an aperture 76 for a purpose to be described hereinafter. Adjacent its other end the top surface of lever 70 engages a fulcrum 78 integrally formed on an internal wall of casing 10 to define a pivotal axis for the lever 70; edgewise movement of the lever 70 is prevented by any suitable means such as internal wall stops (not shown) on the casing 10.

In sliding surface relation to the bottom surface of lever 70 is a latch lever 80 which has a peripheral notch 82 alignable with the aperture 76 in the lever 70 and which has an elongated slot 84 with its major axis transversely disposed to the longitudinal axis of the latch lever 80. As is illustrated in FIGURE 1, the two levers 70 and 80 are connected by a rivet 86 which assures unitary pivotal movement about the fulcrum 78 and which permits latch lever 80 to be pivoted relative to lever 70 in a horizontal plane about a vertical axis defined by the rivet 86. When viewed in a plan view, the left end of lever 80 has a greater width than lever 70 so that a coil spring 88 is mounted in compression between the side edge of lever 80 and an internal wall of casing 10. The coil spring 88 normally biases the latch lever 80 clockwise about the rivet 86 as viewed in FIGURE 2 so that the reduced right end of lever 80 is urged toward the reset pin 52 on the shaft collar 50.

The front wall of casing 10 has a threaded bore receiving an adjusting screw 90, the inner end of which is reduced to form an axially projecting stud 92. The aperture 76 is of sufficient diameter to permit the stud 92 to project therethrough while the bottom surface of lever 70 may rest on the annular shoulder formed on the end of screw 90 by the reduced stud 92. When the lever 70 rests on the shoulder of screw 90, the notch 82 of latch lever 80 is normally biased by the coil spring 88 into engagement with the adjacent annular end of screw 90. Thus, the latch lever 80 may be moved relative to the lever 70 about the vertical axis 86 by the reset pin 52 upon rotary movement of shaft 48 and dial 66.

Unitary movement of levers 70 and 80 about the fulcrum 78 is effected by the ball element 94 which is welded or otherwise secured to the expanding and contracting element of an electric heat motor 96. As is shown in FIGURE 1, the ball element is disposed in the slot 84 of lever 80 so as to engage the bottom surface of the lever 70.

The front wall of casing 10 has a threaded bore and an enlarged counterbore; a mounting stud 98 on the heat motor 96 is slidably disposed in the counterbore and engages the inner end of a set screw 100 adjustably positioned in the threaded bore.

The electric heat motor includes an electric heating coil 102 adapted to be energized as by a 115 volt A.C. power source having lead lines 104 and 106. The lead wires of the electric coil 102 are respectively connected to lead line 106 and to conductor 108. The lead line 104 and conductor 108 are connected to terminal posts of a timer clock indicated generally at 110.

The timer clock 110 may be of any conventional type so the particular structure has not been illustrated. For instance, the timer clock may be a simple mechanically set timer or it may include a mechanically set timer in combination with a time of day clock. If a time of day clock is used the terminal posts may serve for suitable electrical connections to a switching arrangement for the electric motor of such a clock. By way of example, FIGURE 1 illustrates a timer clock 110 having a time setting dial 112 which is rotatable relative to an indicia plate having hour markings for setting to a preselected cooking time. The undersurface of dial pointer 112 is provided with a conductor strip (shown in dashed lines in FIGURE 1) adapted to bridge a pair of spaced contacts 114 and 116 during final return movement of the dial pointer 112. The spacing between the contacts 114 and 116 and the length of the bridging conductor therefor may be varied to suit the requirements of a particular power element such as 96. In this particular installation the contacts 114 and 116 are adapted to be bridged for a period ranging between five and ten minutes which is sufficient time to energize the heating coil 102 and expand the heat motor 96; this closure period commences approximately fifteen minutes before dial 112 returns to its zero position and terminates approximately five minutes before such zero position.

FIGURES 1 and 2 illustrate the positions of the various elements when the control device is not in use; i.e., timer dial 112 and temperature setting dial 66 are at zero position, power element 34 and heat motor 96 are contracted, and valve element 20 is closed so there is no fuel flow to the oven burner. Assuming the housewife desires to cook a roast in the oven at 400° F. for a cooking period of three hours, the time setting dial 112 is rotated counterclockwise to the three hour marking and the temperature setting dial 66 is rotated counterclockwise (as viewed in FIGURE 2) to the 400° F. marking.

Initial movement of dial 66 moves the projection 54 (FIGURE 1) away from the stop surface 56 whereupon the collar guide 50 slides into the casing bore 58 and the inner end of shaft 48 abuts the adjusting screw 65 so that the axial displacement of the shaft 48 is controlled by the axial displacement of the rotatable sleeve 64 and its screw 65. FIGURES 3 and 4 illustrate the relative positions of the control device elements when dial 66 is manually moved to its 400° F. temperature setting. The inward displacement of shaft 48 displaces the collar fulcrum 46 inwardly so that lever 26 is pivoted thereon by the bias of coil spring 30 causing depression of the valve stem 24 and opening the valve disc 20. Thus a flow of fuel is directed to the oven burner and is ignited by any suitable means.

As the oven is being heated the temperature sensing bulb 42 disposed therein will effect a corresponding expansion of the power element 34 which causes lever 26 to pivot counterclockwise about its axis 28 and the valve disc 20 is moved toward a closed position by the bias of its return spring 22. FIGURES 5 and 6 illustrate the relative positions of the control device elements when the oven reaches 400° F. whereupon the valve disc 20 cuts off the flow of fuel to the oven burner. Variations from the desired 400° F. cooking temperature are sensed by the bulb 42 and a corresponding movement is transmitted to the valve disc 20 which thus regulates the flow of fuel to the oven burner to maintain the oven at the desired 400° F. temperature. This regulatory control will continue throughout the cooking period which in this example is three hours.

During the cooking period the dial pointer 112 is being rotated clockwise (FIGURE 1) toward the zero time position and approximately fifteen minutes before the cooking period is terminated, the contacts 114 and 116 are closed by the bridging conductor on the dial pointer 112. Closure of contacts 114 and 116 completes an energizing circuit for the electric heating coil 102 and maintains such circuit for a heating period of approximately five minutes. The five minute heating period for coil 102 causes expansion of the heat motor 96 so that its ball 94 causes upward movement of the heat motor lever 70; i.e., lever 70 pivots counterclockwise about the fixed fulcrum 78 whereupon the relative positions of the control device elements are as illustrated in FIGURES 7 and 8. Accordingly, the offset end 72 of lever 70 abuts the undersurface of fulcrum collar 46 and causes a unitary upward movement of shaft 48 and lever axis 28 whereby the lever 26 pivots counterclockwise (FIGURE 7) about the power element ball 32 and the end of lever 26 is displaced from the valve stem 24. It should be noted that latching lever 80 pivots as a unit with the heat motor lever about the fixed fulcrum 78, however, such counterclockwise pivoting axially displaces the lever notch 82 from the end of screw 90 whereby the latching lever 80 is pivoted relative to the lever 70 about the rivet 86 in a clockwise direction (FIGURE 8) under the bias of coil spring 88. Thus the lever notch 82 is moved into engagement with the shank of stud 92 so that the undersurface of lever 70 is prevented from engaging the end shoulder on screw 90.

Upon termination of the closure period for energizing the heat motor 96, the conductor bridge on the dial pointer 112 is rotated past the contact 114 so that the heating coil 102 is deenergized. During the final five minutes of movement of the timer dial 112 to its zero time position, the heat motor 96 is contracted whereby the bias of coil spring 74 causes the heat motor lever 70 and the latching lever 80 to pivot clockwise (FIGURE 9) about the fixed fulcrum 78 until the undersurface of lever 80 adjacent its notch 82 rests on the end shoulder of screw 90. Lever 26 and fulcrum collar 46 unitarily follow the movement of lever end 72 because of the bias of coil spring 30. Thus by the time the dial point 112 reaches the zero time position, the control device elements are disposed in their relative positions as illustrated in FIGURES 9 and 10. With the notch 82 of the lever 80 in engagement with the end shoulder of screw 90, the heat motor lever 70 is latched in its operative position, slightly pivoted about the fixed fulcrum; in this position lever end 72 has repositioned the shaft 48 and the pivotal axis 28 for the lever 26. As is illustrated in FIGURE 9, the lever 26 is repositioned so that it will open the valve disc 20 at a reduced temperature which may be preset by adjustment of the screw 90. With such an arrangement, the cooking time may be preset, after which the oven may be maintained for an indefinite period at a holding temperature of approximately 130° F. so that the food in the oven will be kept warm until removed. Thus the housewife may place a roast in the oven early in the morning and need not be concerned with removal at a particular time or with resetting the temperature or time dials. Upon expiration of the cooking time, the thermal power element 34 will expand and contract to open and close the valve disc 20 in response to variations from the holding temperature of 130° F. so that regulatory control of fuel flow to the oven burner is effective during the indefinite period of maintaining the holding temperature.

When it is desired to shut off the oven, the timer dial 112 does not have to be operated but only the temperature setting dial 66 need be manipulated by rotation to its off position. During final clockwise rotation of the shaft collar 50 (FIGURE 10), the collar pin 52 engages the side edge of lever 80 which is pivoted against the bias of coil spring 88 in a counterclockwise direction about the rivet 86. Such pivotal movement displaces the notch 82 radially from the stud 92 whereupon the heat motor lever 70 is released from its operative position and, under the bias of coil spring 74, is pivoted clockwise (FIGURE 1) about the fixed fulcrum 78 until its undersurface rests on the end shoulder of screw 90. Accordingly, the heat motor lever is automatically cleared by the temperature setting dial and the control device elements are disposed in their relative positions shown in FIGURE 1, ready for a subsequent cooking operation. During its final clockwise movement, the collar projection 54 (FIGURE 1) rides up the inclined surface and rests on the stop surface 56 so that the valve actuator lever is moved to a positive off position relative to the valve stem 24.

Inasmuch as only a single embodiment of the present invention has been disclosed and inasmuch as the present invention is subject to many modifications and various changes in detail, it is intended that all matter contained in the foregoing description or shown on the accompanying drawings shall be interpreted as illustrative and not in a limiting sense.

What is claimed is:

1. In a control device for cooking ovens and the like, combination comprising a casing having an inlet and an outlet adapted to be connected to an oven burner, valve means in said casing for controlling a fuel flow between said inlet and said outlet, lever means for moving said valve means between a plurality of controlling positions, thermally responsive means operatively connected to said lever means for moving the same in response to variations from selected temperatures, temperature setting means operatively connected to said lever means for positioning the same in a selected temperature position, time response heat motor means including a repositioning lever operatively connected to said lever means for repositioning the same in a second selected temperature position at the expiration of a preselected cooking time, and means operated by said temperature setting means when moved to an off position to effect movement of said lever means from the second selected temperature position.

2. The combination as recited in claim 1 wherein said means operated by said temperature setting means when moved to an off position includes stop means for positioning said lever means in a positive off position.

3. In a control device for cooking ovens and the like, the combination comprising valve means movable between a plurality of positions for controlling a fuel flow to an oven burner, lever means for actuating said valve means, thermally responsive means imparting a regulatory movement to said lever means in response to temperature variations, a shaft element having a fulcrum defining a pivotal axis for said lever means, temperature selection means including a rotatable sleeve, an operative connection between said shaft element and said sleeve whereby rotation of said sleeve causes axial displacement of said shaft element and its fulcrum to move the pivotal axis and said lever means to a selected temperature position for a predetermined cooking period, timing means for selecting the predetermined cooking period, heat motor means energized by said timing means for a short period prior to expiration of the cooking period, repositioning means actuated in response to an energized condition of said heat motor means and being operatively associated with said shaft element to axially reposition said shaft element and its fulcrum whereby the pivotal axis and said lever means are repositioned to a reduced temperature position, and latching means retaining said repositioning means in its operative position upon expiration of the energizing period for said heat motor.

4. The combination as recited in claim 3 wherein said repositioning means includes a pivoted lever and an adjustable screw element engages said pivoted lever to limit movement in one direction.

5. The combination as recited in claim 4 wherein said latching means includes a latching lever operatively connected to said pivoted lever for pivotal movement therewith and for independent movement relative to said pivoted lever, said latching lever having a notched portion engaging said adjustable screw element upon actuation of said pivoted lever whereby said pivoted lever is latched in its actuated position.

6. The combination as recited in claim 5 wherein said shaft element includes a release pin rotated into engagement with said latching lever when said sleeve is rotated to an off position whereby said latching lever is moved relative to said pivoted lever for releasing the same.

7. In control apparatus for cooking ovens and the like, the combination comprising control means movable between a plurality of positions to control the heat in an oven, actuating means for said control means and being movable between an off position and cooking and warming temperature positions, manually operated temperature setting means operatively connected to said actuating means for moving the same from its off position to its cooking temperature position, heat motor means including repositioning means to terminate a cooking operation, said repositioning means being operative for moving said actuating means to its warming temperature position, thermally responsive means for imparting a regulatory movement to said actuating means when in both its cooking and warming temperature positions, retaining means operated by said repositioning means and retaining said actuating means in its warming temperature position, and means for resetting said retaining means to a released position, said resetting means being operated by said manually operated temperature setting means when moved to an off position whereby said actuating means is retained in its warming temperature position until moved to its off position by said manually operated temperature setting means.

8. The combination as recited in claim 7 wherein said repositioning means includes adjustment means for selectively varying the warming temperature position of said repositioning means.

9. The combination as recited in claim 8 wherein said actuating means includes a pivoted lever and said manually operated temperature setting means includes shaft means having a fulcrum thereon for said pivoted lever.

10. The combination as recited in claim 9 wherein said pivoted lever has an intermediate portion between opposite end portions, said intermediate portion engaging said fulcrum, resilient means biasing one end portion of said pivoted lever toward said control means, and said thermally responsive means includes an expanding and contracting power element engaging the other end portion of said pivoted lever, said power element and said resilient means acting in opposition to each other for causing pivotal movement of said pivoted lever about said fulcrum.

References Cited by the Examiner
UNITED STATES PATENTS

| | | | |
|---|---|---|---|
| 2,489,896 | 1/49 | Kempton | 236—46 X |
| 2,545,846 | 3/51 | Dunn | 236—46 |
| 2,630,515 | 3/53 | McCormick et al. | 219—20.5 |
| 2,656,984 | 10/53 | Caparone | 236—48 X |
| 3,090,560 | 5/63 | Holzboog et al. | 236—15 X |
| 3,123,298 | 3/64 | Wolffe | 236—46 |

EDWARD J. MICHAEL, *Primary Examiner.*

ALDEN D. STEWART, *Examiner.*

Disclaimer 3,193,200.—*James R. Willson*, Greensburg, Pa. THERMOSTATIC CONTROL AND TIMER CLEARING SYSTEM. Patent dated July 6, 1965. Disclaimer filed Apr. 1, 1968, by the assignee, *Robertshaw Controls Company*.

Hereby enters this disclaimer to all the claims of said patent.

[*Official Gazette August 13, 1968.*]